K. B. KILBORN.
INTERLOCKING MOLD.
APPLICATION FILED DEC. 14, 1917.
1,375,660.
Patented Apr. 19, 1921.
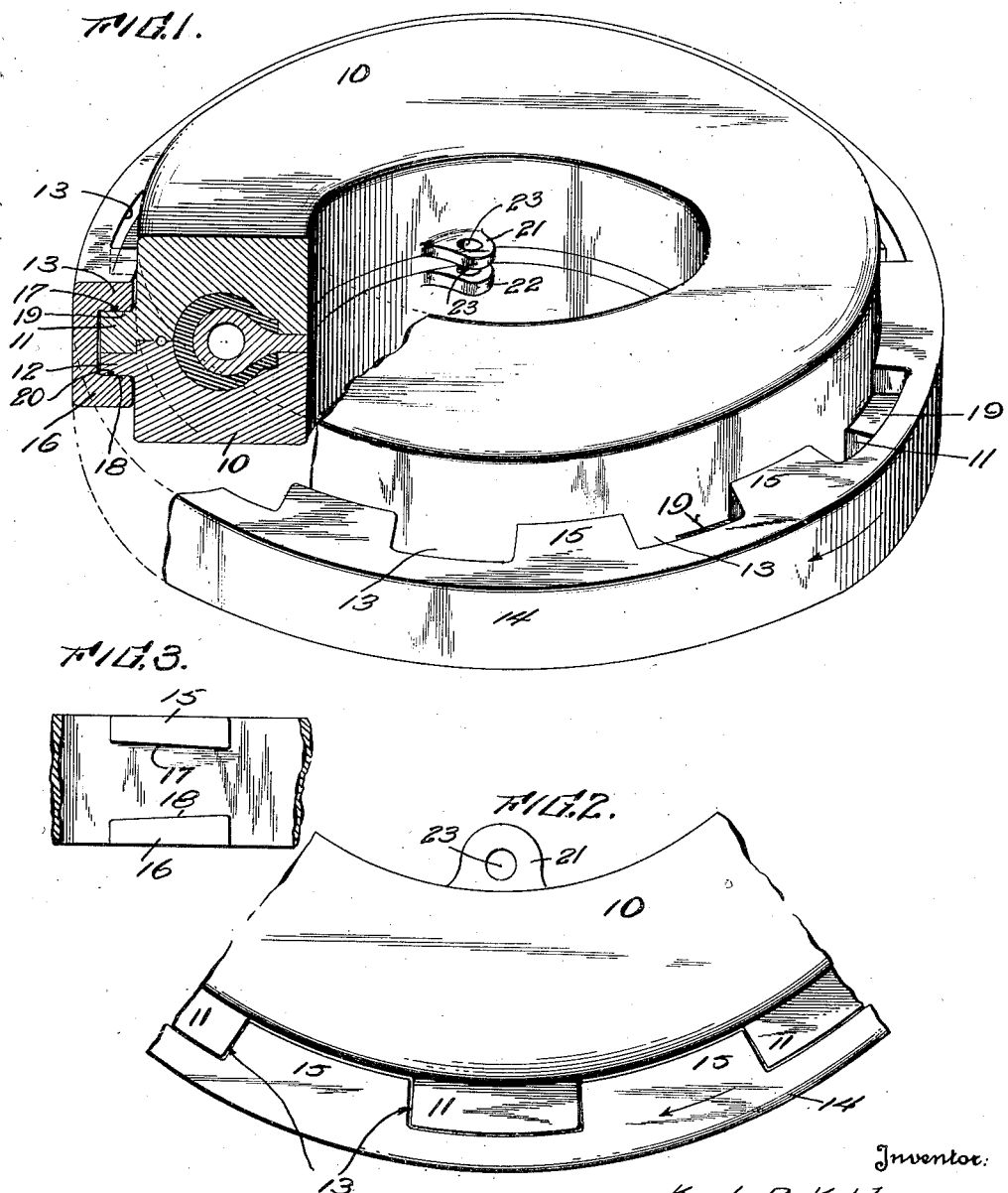
Inventor:
Karl B. Kilborn,
By C. L. Landon
his Attorney
Witnesses:

UNITED STATES PATENT OFFICE.

KARL B. KILBORN, OF AKRON, OHIO, ASSIGNOR TO THE GOODYEAR TIRE & RUBBER COMPANY, OF AKRON, OHIO, A CORPORATION OF OHIO.

INTERLOCKING MOLD.

1,375,660.  Specification of Letters Patent.  Patented Apr. 19, 1921.

Application filed December 14, 1917. Serial No. 207,121.

*To all whom it may concern:*

Be it known that I, KARL B. KILBORN, a citizen of the United States, residing at Akron, in the county of Summit and State of Ohio, have invented new and useful Improvements in Interlocking Molds, of which the following is a specification.

My present invention relates to vulcanizing molds of the general type used in tire manufacture and constructed of complemental sections adapted to be mated for inclosing the tire to be vulcanized.

The commonly accepted practice of vulcanizing pneumatic vehicle tires calls for the filling of a hydraulic press with a plurality of molds, each of which contains a tire to be cured. The molds are then simultaneously compressed against a fixed head by the action of a hydraulic plunger until the complemental parts composing each mold are properly and respectively mated to apply the required pressure to the contained tires.

The use of the hydraulic apparatus for obtaining the proper mating of the mold parts is unduly expensive, for the apparatus is cumbersome, occupying therefore an undue amount of floor space, and is also slow in operation.

The principal object of the invention is therefore to provide a mold of such construction that the expensive hydraulic apparatus may be dispensed with and to advantage by positively interlocking the mating mold parts in a manner and by means which assure a proper degree of compression of the contained tire carcasses.

Another and more specific object of the invention is to provide means whereby a degree of pressure between the mold parts may be varied at will through adjustment of the means which interlock the mold parts.

In carrying out my invention I provide the mold parts at their peripherally mating edges with a plurality of corresponding male locking flanges of such nature that an axial mating of the mold parts in respect to the female locking members of an independent locking ring, which interlocks the two sets of flanges, serves to close the mold tightly upon the article to be cured or vulcanized, without the need for application to the molds of further pressure means. The engaging surfaces of the male and female locking members are oppositely beveled whereby the degree of pressure between the mold parts may be varied without an unlocking of the apparatus.

The above and additional objects of a similar nature, which will be hereinafter more specifically treated, are preferably accomplished by such means as are illustrated in the accompanying drawings, described in the following specification, and then more particularly pointed out in the claims which are appended hereto and form part of this application.

With reference to the drawings, wherein there has been illustrated a preferred embodiment of the invention as it is reduced to practice, and throughout the several views of which similar reference numbers designate corresponding parts:

Figure 1 is a perspective view, partly broken away, to more clearly illustrate the relation between the mold parts and the locking ring, and illustrating the mold in a locked position;

Fig. 2 is a plan view of a portion of a mold showing the mold parts properly mated and inserted into the locking ring just prior to the rotating of the locking ring; and Fig. 3 is an inside view of a portion of the locking ring illustrating a pair of the female members.

In all its main features, save only the locking means interposed between the opposite mold parts, the mold of my invention is constructed in accordance with the present practice. The locking elements are arranged at the periphery of each mold part and in such position that they are adapted to aline with each other when the mold parts are brought into their mated position.

The corresponding mold parts 10 are constructed with outstanding peripheral flanges or lugs 11 and 12 respectively, which, when the mold parts are correctly mated, are adapted to slide through the corresponding recesses 13 in the locking ring 14 to the required position, as will be more readily understood.

The outer side walls of the lugs 11 and 12 are inclined away from the plane of engaging faces of the mold parts.

The locking ring 14 consists of a circular band constructed with a series of equally spaced inwardly projecting lugs 15 and 16 which correspond with the intervals or spaces between the lugs 11 of one mold part and lugs 12 of the opposite mold part and form the female members of the locking combination. The opposing faces 17 and 18 of the corresponding lugs 15 and 16 are tapered or inclined away from each other, the object of which is apparent. When the mold parts are in their correct position and the locking ring has been placed as shown in Fig. 2, a slight rotation of the locking ring in the direction of the arrow will cause the inclined shoulders 17 and 18 to engage the oppositely inclined faces 19 and 20 of the lugs 11 and 12, thereby locking the mold parts together.

It will be seen that the action of the faces 17 and 18 upon the faces 19 and 20 in rotating causes the mold parts to be drawn together and to become more firmly mated. A sufficient rotation of the ring will impart to the mold sections the required pressure usually derived from the action of the hydraulic ram in the heater, as will be readily understood.

To facilitate the handling of and to prevent the twisting or turning of the mold parts in locking or unlocking, I provide some inwardly projecting lugs 21 and 22, provided with apertures 23, adapted to receive a spike or pin to hold the mold parts in alinement.

From the foregoing it will be readily seen that by constructing a mold of the character described I have produced a mold that is superior to the present type of molds used and have evolved a satisfactory answer to the prevalent difficulties arising in this art and traceable to the expensive and unwieldly apparatus which was heretofore considered necessary to obtain a proper pressure upon the article to be vulcanized within the mold.

By using an independent locking ring I have eliminated all possible conditions wherein the tire carcass can be distorted, bruised or cut, usually experienced in turning the complemental mold parts in respect to each other, in mating.

What I claim is:

1. A mold comprising complemental annular mold sections providing an annular mold chamber between them, means for holding the sections against independent turning movement and means coöperating with the sections and turnable about them for drawing the sections together and holding them in their drawn together relation.

2. A vulcanizing mold for tires consisting of separate annular complemental sections, the mating parts of which are provided with grooves for the reception of a tire carcass, outwardly projecting lugs on the periphery of each of said sections, the lugs on one of the sections being adapted to engage and aline with the lugs on the other section when the sections are mated, and said lugs being provided with inclined faces opposite to the engaging faces of the lugs, a circular band provided with spaces through which the alined lugs on the mold sections are passed, and with two rows of inwardly projecting lugs, the lugs in one row being in alinement with the lugs in the other row and adapted to fit in the spaces between the lugs on the mold sections, and said lugs on the circular band being provided with inclined faces adapted to engage the first mentioned inclined faces when the circular band is turned to press the mold sections together, and means to prevent twisting or turning of the mold sections when the circular band is turned relatively to the mated mold sections.

In testimony whereof, I have hereunto signed my name in the presence of two subscribing witnesses.

KARL B. KILBORN.

Witnesses:
J. H. WHITE,
A. D. HARTENSTEIN.